UNITED STATES PATENT OFFICE.

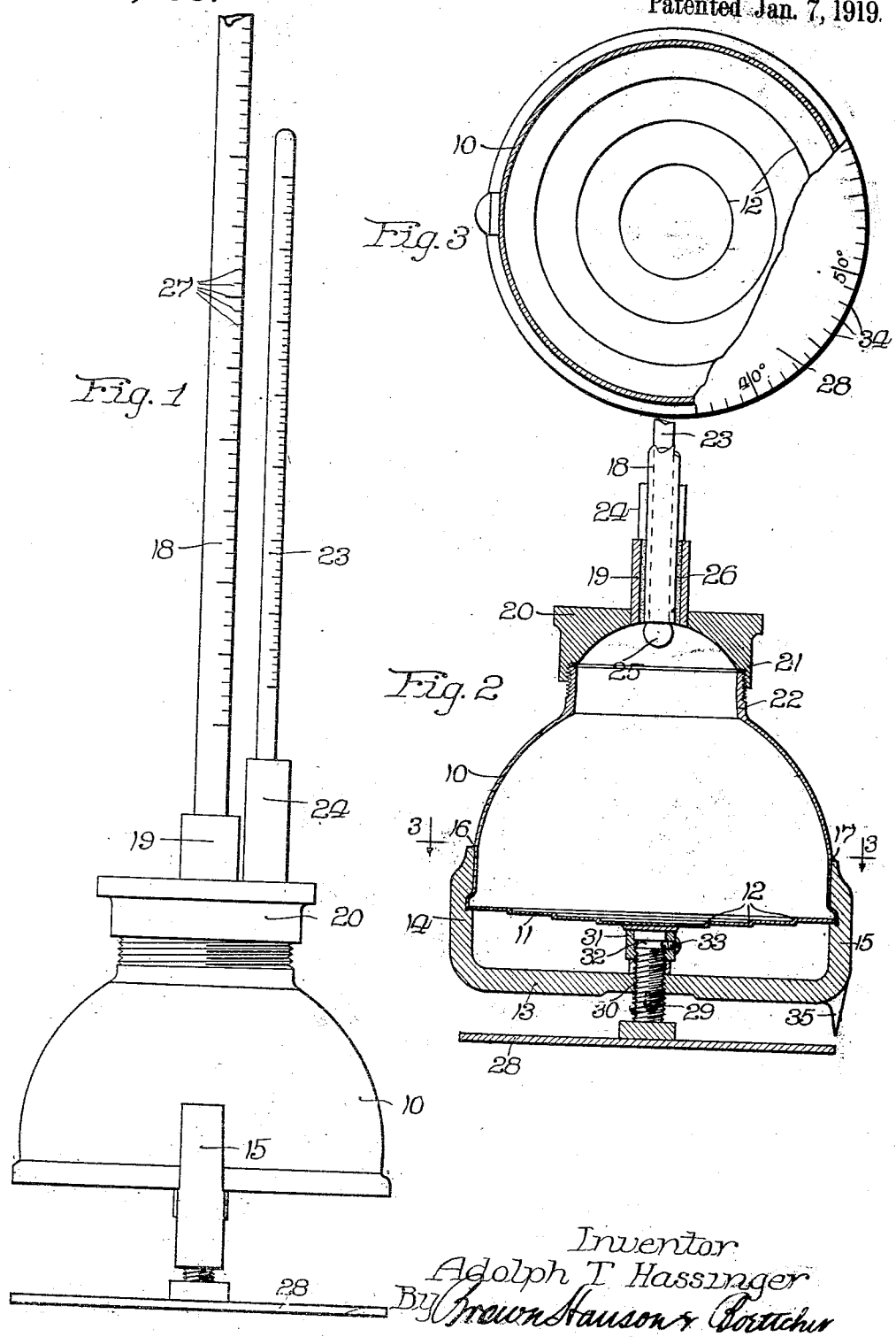

ADOLPH T. HASSINGER, OF CHICAGO, ILLINOIS.

APPARATUS FOR DETERMINING THE SPECIFIC GRAVITY OF LIQUIDS.

1,290,553.   Specification of Letters Patent.   Patented Jan. 7, 1919.

Application filed October 13, 1917.  Serial No. 196,489.

*To all whom it may concern:*

Be it known that I, ADOLPH T. HASSINGER, a citizen of the United States, residing at Chicago, in the county of Cook and State of Illinois, have invented a certain new and useful Improvement in Apparatus for Determining the Specific Gravity of Liquids, of which the following is a full, clear, concise, and exact description, reference being had to the accompanying drawings, forming a part of this specification.

My present invention relates to apparatus for determining the specific gravity of liquids.

More particularly my invention relates to volumetric measuring means in the form of a compensating vessel arranged to indicate the ratio between the volume and weight of a liquid in terms of its specific gravity.

My invention aims to provide a measuring vessel having compensating means for accurately measuring the specific gravities of liquids of widely different temperatures.

The procedure followed in the practice of my invention is to first weigh out a specified quantity of the liquid and then to measure its volume in the calibrated compensating vessel of my invention, the displacement of the liquid in said vessel being readable directly in terms of specific gravity.

This method is simple and accurate and has found extensive practice in the dairy industry for determining the percentage of butter fat in milk and cream. The device as employed for this purpose is arranged to read in percentages of volume.

My invention can be used for measuring the percentage of butter fat in milk with particular nicety and as I contemplate using my invention for this purpose, I shall describe in detail the same in this adaptation, though it will be evident that the invention is equally adaptable to the measurement of the specific gravities of acids, waters, oils or any other liquids.

I am aware that various methods have been employed for compensating for thermal differences in the liquids tested, such as a graduated scale movable for different temperatures, this substantially amounting to increasing or diminishing the volume of the sight glass along its linear dimension, but inasmuch as the sectional area of the glass is small the increased volume obtained thereby was small compared to the volume of the vessel itself, accordingly the temperature range was too limited.

The compensating means mentioned hereinbefore in my present invention includes broadly means for varying the capacity of the vessel itself and thereby obtain a greatly increased thermal range of adjustment to compensate for the variations in temperature of different liquids tested.

Other objects and advantages to be derived from the use of my present invention will appear from the following detailed description and the claims, taken with an inspection of the accompanying drawing, in which—

Figure 1 is a side elevation of a testing vessel embodying the improvements of my invention;

Fig. 2 is a fragmental vertical sectional view of the same; and

Fig. 3 is a sectional view taken on the line 3—3 of Fig. 2.

Referring more particularly to the drawing, 10 designates the main body of the testing receptacle, the same being semi-spherical in cross-section and having a flexible bottom 11. The bottom is soldered or otherwise connected to the side wall, said bottom being formed with a plurality of annular shoulders 12 which facilitate flexing of the bottom when desired for a purpose which will hereinafter appear.

A supporting yoke is provided for the body 10, said yoke comprising a main portion 13 and a pair of arms 14 and 15, forming substantially a U-shaped structure. The arms are connected at 16 and 17 to the sides of the vessel 10, the portion 13 extending diametrically of the bottom and in spaced relation thereto as best shown in Fig. 2.

The calibrating tube for use in conjunction with the vessel 10 is designated 18 and is preferably constructed of glass or other transparent material. The tube 18 extends to an extension 19 formed on a cap 20 adapted for threaded engagement as at 21 with a collar 22 formed on the upper end of the vessel 10. The cap 20 is adapted to seal the vessel but is readily removable when desired. A temperature indicator 23 such as a Fahrenheit thermometer is carried by the cap 20 and projects from an extension 24 formed on said cap. The lower end of the thermometer 23 is constructed in the usual manner as at 25 and is extended within the vessel 10 and in contact with the liquid contents thereof. Plaster-of-Paris or other sealing medium 26 is employed for mounting the glass tube 18 and the thermometer in the metal cap 20. Variations may be made in the structure of the tube, thermometer and cap and the arrangement of the same within the scope of my invention.

The tube 18 is calibrated with a scale 27 to indicate in percentages the specific gravity of the liquid contents of the vessel and tube.

Means to flex the bottom 11 and thereby change the volumetric capacity of the vessel 10 and tube 18 connected thereto is provided, said mechanism comprising preferably a rotatable disk member 28 carrying a threaded stud 29. The stud is threaded into an opening 30 formed in the bar 13, the upper end of the stud being engaged in a recessed projection 31 formed on the bottom 11. An annular groove 32 is formed in the stud 29 within the projection 31 and a set-screw 33 engages in said annular groove to hold the stud in engagement with the bottom 11. Upon rotation of the disk the stud will be caused to move vertically in the bar 13 which will impart a corresponding motion to the bottom 11, increasing or diminishing the volumetric capacity of the vessel 10 and tube 18. A circular scale 34 is provided on the upper face of the disk 28, said scale corresponding in its divisions to the degrees of temperature, the scale being of a range to reach the ends for which the device is designed. That is, the range may be from 35° to 100°, or any other suitable range desired. At 53° the disk 28 would be in the position shown in Fig. 3 and a pointer 35 carried by the arm 15 will indicate on the scale 34 the degree of temperature for which the device is set.

In the broadest conception of my invention, the body 10 and tube 18 may be considered as one vessel, the body 10 being provided merely for structural convenience.

In operation, the disk 28 is normally in the position for measuring liquids of a low temperature, the lowest temperature which a liquid would be without freezing, such as milk in cans. Assume that in the test a quantity of milk (300 grams) is placed in the vessel at a temperature of 80. This would be close to the temperature which milk usually is when taken from the cow.

The temperature of the milk will be noted on the thermometer 23 and the disk 28 rotated until the 80th division point on the scale 34 corresponding to the 80° Fahrenheit is in registration with the pointer 35. The receptacle or vessel is now adjusted for milk at that temperature and by glancing at the scale 27 on the tube 18 the specific gravity of the milk will be indicated. Should the temperature be higher or lower than 80 the disk 28 will be rotated to bring the corresponding temperature indication on the scale 34 into registration with the pointer 35. It is assumed in the foregoing description of the operation that one revolution of the disk will give a sufficient range in size varying of the vessel to accommodate the normal changes in temperature which would be present in various samples of milk. Of course, it will be understood that the pitch of the thread on the stud 29 must be of a sufficient degree to give the range of movement of the bottom 11 desired. I set no arbitrary pitch to the thread since this can only be determined by experiment and adjustment to a standard vessel. The amount of milk placed in the vessel depends, of course, upon the amount for which the vessel is designed, that is, the 300 gram amount mentioned in the foregoing is not to be taken as a fixed amount, since for larger or smaller testing devices, larger or smaller amounts are to be used in the test, but the standard of operation is identical in larger or smaller devices. In the use of my improved liquid testing device it will be readily apparent that by the adjustment of the bottom the volumetric capacity of the vessel is changed to adjust itself to the variations in displacement of the liquid at various temperatures.

As described, and as pointed out hereinbefore, the device is particularly useful in connection with determining the percentage of butter fat in milk and cream, but, of course, I do not limit myself to this adaptation of the invention and also reserve the right to make detail changes in the structure thereof such as do not depart from the spirit and scope of the invention as claimed.

I claim:

1. In combination, a vessel calibrated to indicate the volume of a liquid, temperature indicating means on said vessel, and means graduated in terms of temperature for varying the capacity of the vessel to compensate for differences of temperature of the liquid placed therein.

2. The combination of a vessel variable in capacity, means to adjust the vessel to various capacities, means graduated in terms of temperature to regulate the adjustment, a temperature indicator on the vessel, and a volumetric graduated member on said vessel to indicate the displacement of the liquid therein.

3. In combination, a vessel calibrated to indicate the volume of a liquid placed therein, means to change the capacity of the vessel to compensate for temperature variations in various liquids received therein, and means calibrated to regulate first said means.

4. In combination, a vessel calibrated to indicate the volume of a liquid placed therein, and means having a scale to regulate the change in volumetric capacity of said vessel to compensate for variations in the temperatures of liquids placed in said vessel.

5. In combination, a vessel calibrated to indicate volume at a predetermined temperature, a temperature indicator on the vessel, and calibrated means to change the volumetric capacity of the vessel to compensate for variations in the temperature of liquids placed in said vessel.

6. In combination a vessel having a volume indicating scale thereon, a temperature indicator on the vessel, said vessel being variable in size, and means on the vessel calibrated in accordance with temperature changes to vary the volumetric capacity of the vessel to compensate for various temperatures of liquids placed in the vessel for testing.

7. In combination, a vessel calibrated to indicate volume having a flexible bottom, means to flex said bottom to change the volumetric capacity of the vessel, means calibrated to correspond to various temperatures for regulating first said means and a temperature indicator on said vessel.

8. In combination, a vessel calibrated to indicate volume having a flexible bottom, a frame carried by the vessel, a threaded stud engaging through said frame with the flexible bottom, a calibrated disk to rotate said stud in accordance with temperature changes for varying the volumetric capacity of the vessel, and a temperature indicator on the vessel.

In witness whereof, I hereunto subscribe my name this 8th day of October, A. D. 1917.

ADOLPH T. HASSINGER.